(12) United States Patent
Mears

(10) Patent No.: US 8,167,246 B1
(45) Date of Patent: May 1, 2012

(54) TETHERING SYSTEM FOR INFLATABLE AIRFOILS

(75) Inventor: Tony W. Mears, Longmont, CO (US)

(73) Assignee: Floatograph Technologies, LLC, Silver Spring, MD (US)

(*) Notice: Subject to any disclaimer, the term of this patent is extended or adjusted under 35 U.S.C. 154(b) by 139 days.

(21) Appl. No.: 12/657,169

(22) Filed: Jan. 14, 2010

Related U.S. Application Data

(63) Continuation-in-part of application No. 12/583,901, filed on Aug. 27, 2009, which is a continuation-in-part of application No. 12/462,085, filed on Jul. 29, 2009, which is a continuation-in-part of application No. 12/386,232, filed on Apr. 15, 2009.

(51) Int. Cl.
*B64C 31/06* (2006.01)

(52) U.S. Cl. .......................... 244/153 R; 244/30; 244/31

(58) Field of Classification Search ............. 244/30–33, 244/155 A, 153 R, 145, 152, 142
See application file for complete search history.

(56) References Cited

U.S. PATENT DOCUMENTS

| | | | | |
|---|---|---|---|---|
| 2,398,744 A | * | 4/1946 | Jalbert | 244/33 |
| 2,919,082 A | * | 12/1959 | Winzen et al. | 244/31 |
| 3,395,877 A | * | 8/1968 | Macfadden et al. | 244/33 |
| 4,919,365 A | * | 4/1990 | Mears | 244/153 R |
| 6,016,998 A | * | 1/2000 | Allsopp | 244/153 R |
| 2007/0246602 A1 | * | 10/2007 | Steinkerchner et al. | 244/30 |

OTHER PUBLICATIONS

Sky-Dockfloatograph Technologies LLC./ Sky-Doc Balloons Images, Feb. 5, 2005, (http://web.archive.org/web/20050205022328/http://www.skydocballoon.com/images/).*

* cited by examiner

*Primary Examiner* — Timothy D Collins
*Assistant Examiner* — Jamie S Stehle
(74) *Attorney, Agent, or Firm* — Emery L. Tracy

(57) ABSTRACT

A tethering system for controlling an inflatable airfoil is provided. The inflatable airfoil has a horizontal center line and a vertical center line. The tethering system includes an airfoil wing secured to the inflatable airfoil. A first forward attachment ring is secured to the inflatable airfoil. A second forward attachment ring is secured to the inflatable airfoil. A rear attachment ring is secured to the inflatable airfoil. A center attachment ring is secured to the inflatable airfoil. A first airfoil reinforcement strap is secured between the first forward attachment ring and the center attachment ring. A second airfoil reinforcement strap extends between the second forward attachment ring and the center attachment ring. A third airfoil reinforcement strap extends between the rear attachment ring and the center attachment ring. A control mechanism controls the inflatable airfoil during flight.

17 Claims, 5 Drawing Sheets

TETHERING SYSTEM FOR INFLATABLE AIRFOILS

The present application is a continuation-in-part of pending U.S. patent application Ser. No. 12/583,901, filed Aug. 27, 2009, entitled "Airfoil Wing System for Inflatable Airfoils", which is a continuation-in-part of pending U.S. patent application Ser. No. 12/462,085, filed on Jul. 29, 2009, entitled "High Wind Release Vent for Inflatable Airfoils", which is a continuation-in-part of pending U.S. patent application Ser. No. 12/386,232, filed on Apr. 15, 2009, entitled "Adjustable Wing Line Apparatus for Inflatable Airfoils".

BACKGROUND OF THE INVENTION

1. Field of the Invention

This invention relates generally to a tethering system for inflatable airfoils and, more particularly, the invention relates to a tethering system for inflatable airfoils allowing a user to better control and adjust the angle of an airfoil wing and inflatable airfoil during flight.

2. Description of the Prior Art

There are numerous inflatable devices for providing location information; however, these devices are cumbersome, are not simple to operate, will not fly under windy conditions, are driven to the ground in high wind conditions, have no maneuverability, and are dangerous to bring back to the ground in a controlled manner. MacFadden, U.S. Pat. No. 3,395,877, claims a aerodynamically stable site marker balloon capable of being tethered under adverse flight condition. However, although MacFadden may fly where the spherical balloon will not, MacFadden will not fly and in fact will be driven to the ground in high wind conditions.

Schnee, U.S. Pat. No. 4,768,739, requires at least a light wind and has significant drawbacks in high winds as it would drag the individual. It claims the kite use as a sail. The Schnee device would be totally unusable in winds having velocity exceeding 20 miles per hour whereas the within invention will fly with wind velocity up to 80 miles per hour. Bringing the Schnee device to the ground during heavy winds can be a difficult if, if not impossible, task.

Accordingly, there exists a need for a tethering system for an inflatable airfoil allowing a user to adjust the angle of an airfoil wing during flight to bring the inflatable airfoil to the ground during flight. Additionally, a need exists for a tethering system for an inflatable airfoil wherein a plurality of straps cross the top of the inflatable airfoil for better control of the inflatable airfoil thereby maximizing the flight and stability of the inflatable airfoil. Furthermore, there exists a need for a tethering system for an inflatable airfoil wherein the airfoil wing has a strap secured thereto for better control and adjustability of the airfoil wing for maintaining the optimum flight angle.

SUMMARY

The present invention is a tethering system for controlling an inflatable airfoil. The inflatable airfoil has a horizontal center line and a vertical center line. The tethering system comprises an airfoil wing secured to the inflatable airfoil. A first forward attachment ring is secured to the inflatable airfoil. A second forward attachment ring is secured to the inflatable airfoil. A rear attachment ring is secured to the inflatable airfoil. A center attachment ring is secured to the inflatable airfoil. A first airfoil reinforcement strap is secured between the first forward attachment ring and the center attachment ring. A second airfoil reinforcement strap extends between the second forward attachment ring and the center attachment ring. A third airfoil reinforcement strap extends between the rear attachment ring and the center attachment ring. A control mechanism controls the inflatable airfoil during flight.

The present invention further includes a tethering system for controlling an inflatable airfoil. The inflatable airfoil has a horizontal center line and a vertical center line. The tethering system comprises an airfoil wing secured to the inflatable airfoil with the airfoil wing having a connecting edge, a first side edge extending from the connecting edge, a second side edge extending from the connecting edge substantially opposite the first side edge, a first leading edge extending from the first side edge, and a second leading edge extending from the second side edge. A surface reinforcement strap is secured to the airfoil wing from the intersection of the first leading edge and the second leading edge across the airfoil wing to the proximate center of the connecting edge. The intersection of the first leading edge and the second leading edge forms a tether line attachment point wherein the surface reinforcement strap is securable to the inflatable airfoil adjacent the connecting edge.

DETAILED DESCRIPTION OF THE PREFERRED EMBODIMENTS

Figure 1:
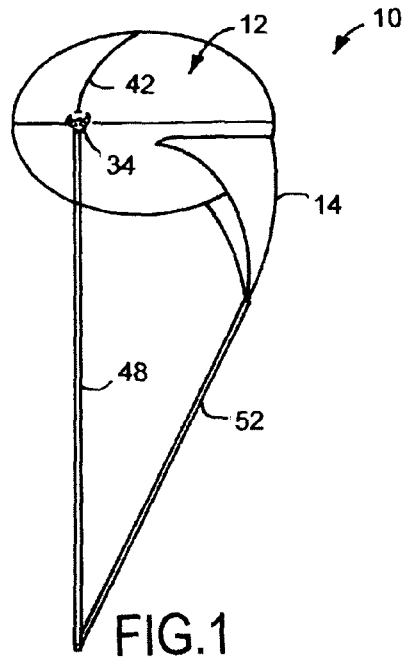
FIG. 1 is a side elevational view illustrating a tethering system, constructed in accordance with the present invention, for inflatable airfoils.
Figure 2:
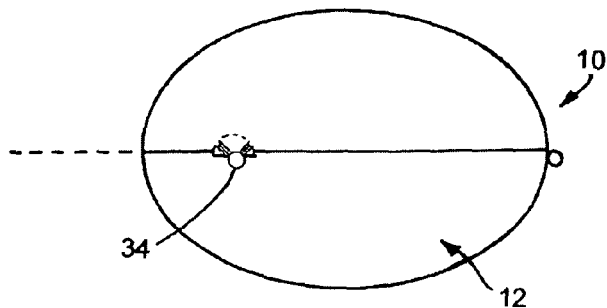
FIG. 2 is a side elevational view illustrating the tethering system, constructed in accordance with the present invention, for inflatable airfoils with ideal location for attachment rings.
Figure 3:
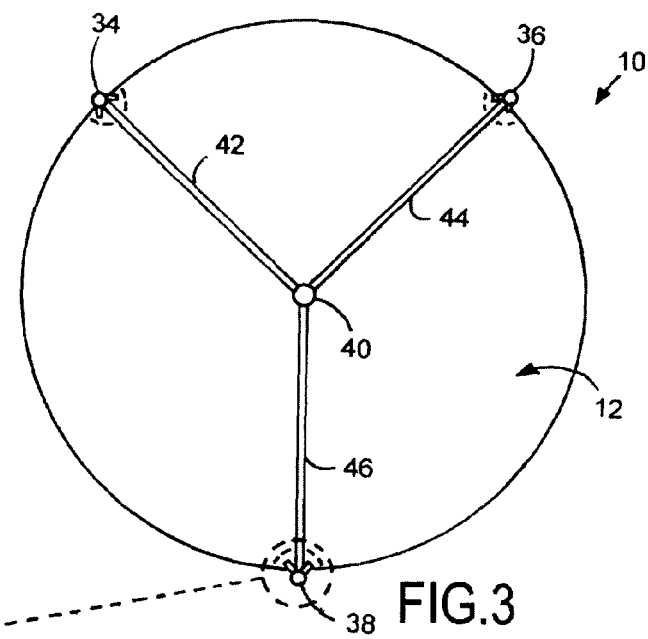
FIG. 3 is a top plan view illustrating the tethering system, constructed in accordance with the present invention, for inflatable airfoils with a plurality of straps across a top surface of the inflatable airfoil with the straps joining in the center of the top surface of the inflatable airfoil.
Figure 4:
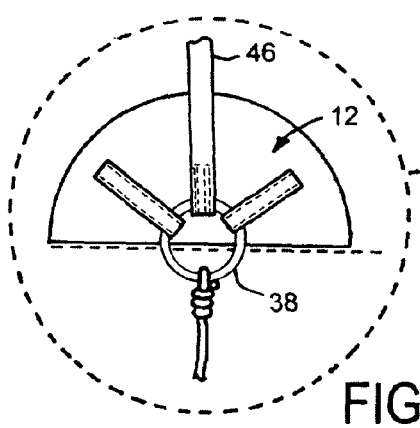
FIG. 4 is an expanded top plan view illustrating a single attachment ring of the tethering system, constructed in accordance with the present invention, for inflatable airfoils.
Figure 5:
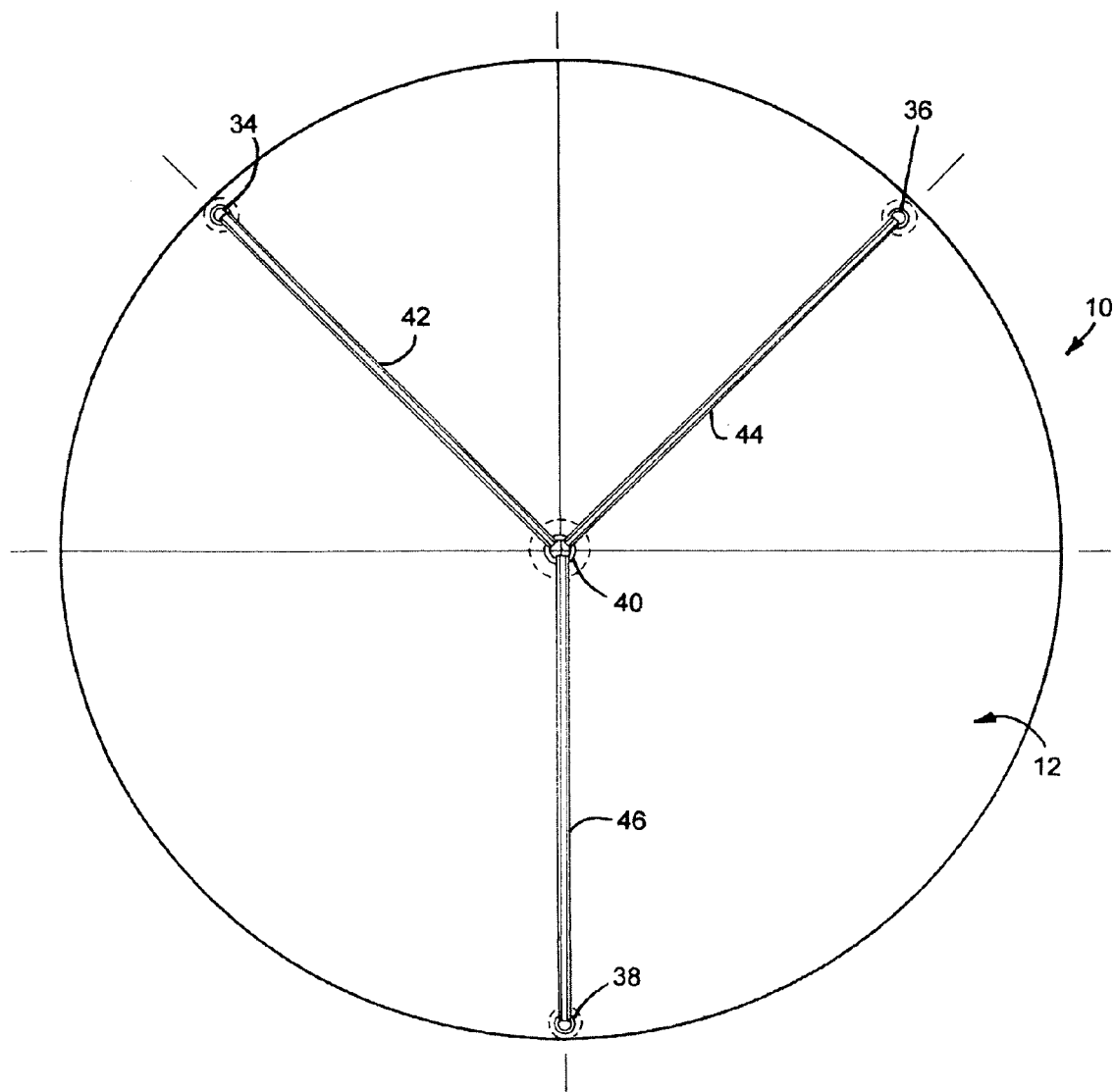
FIG. 5 is another top plan view illustrating the tethering system, constructed in accordance with the present invention, for inflatable airfoils.
Figure 6:
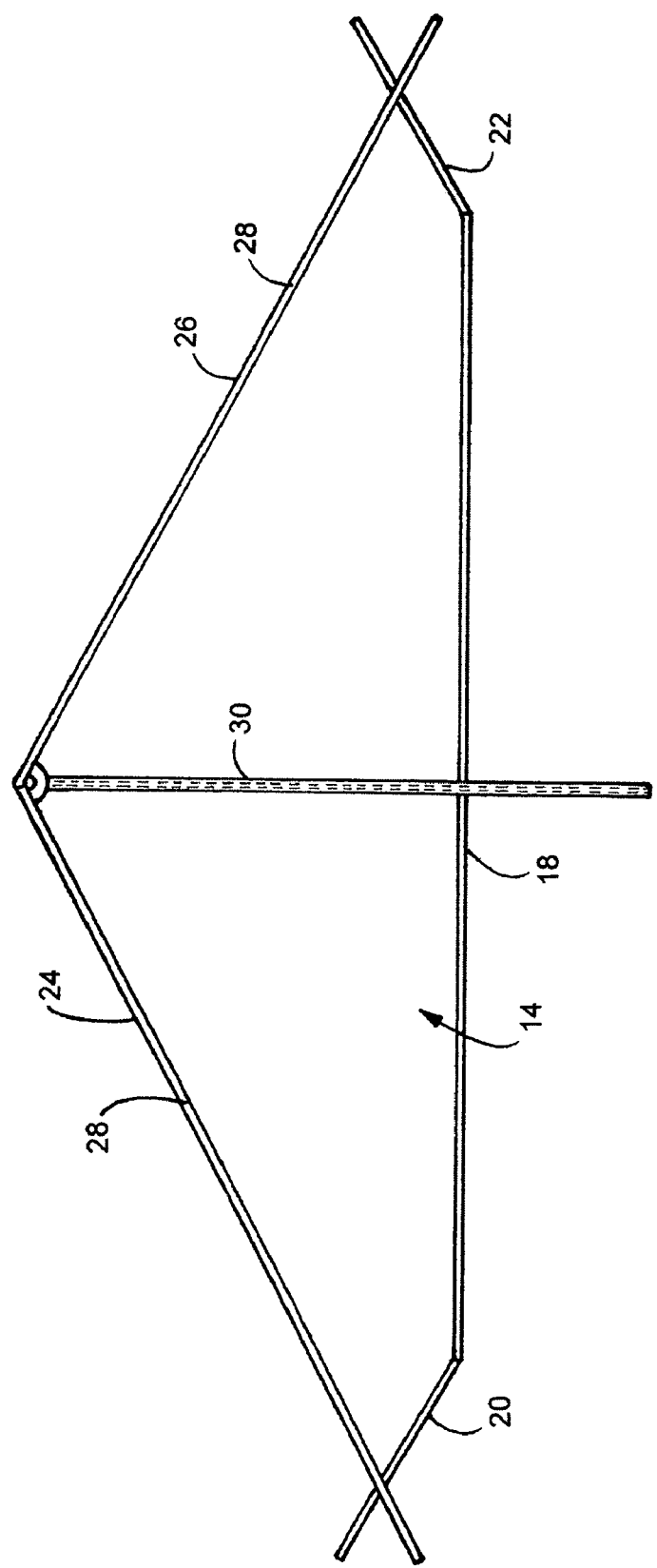
FIG. 6 is a top plan view illustrating an airfoil wing for use with the tethering system, constructed in accordance with the present invention, for inflatable airfoils.
Figure 7:
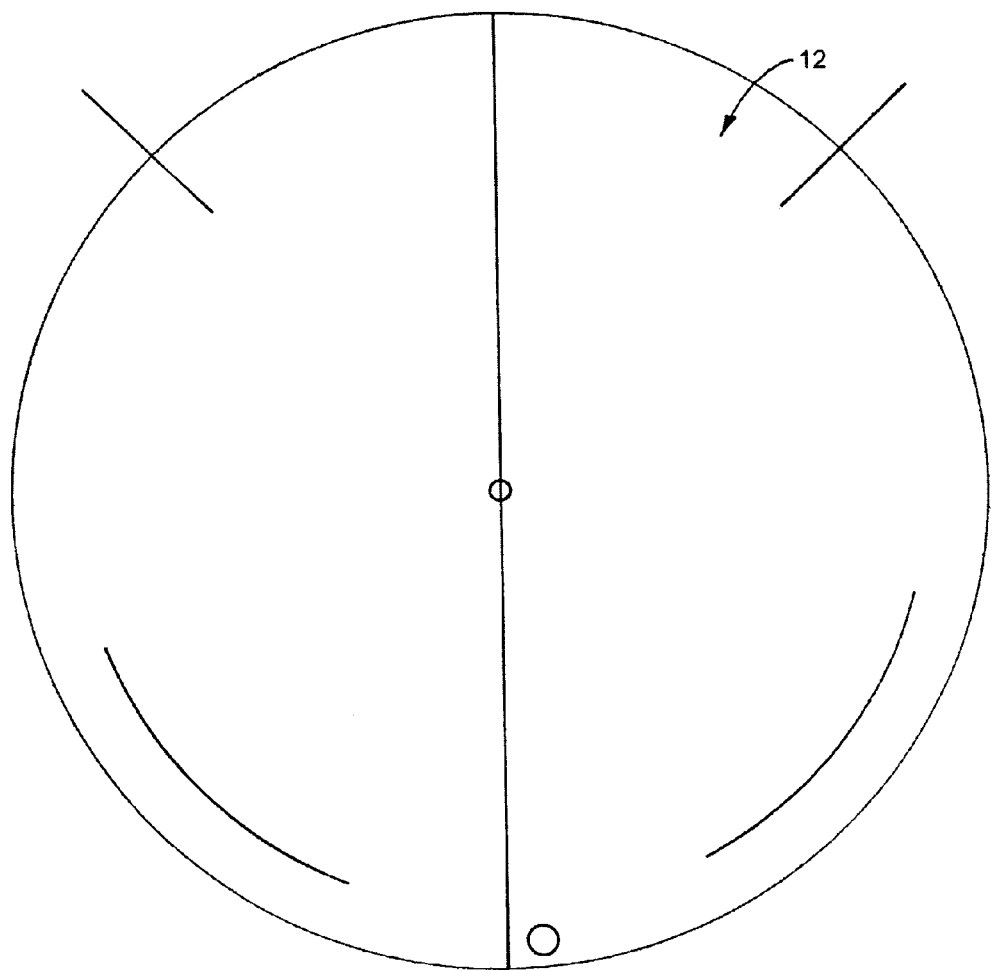
FIG. 7 is a bottom plan view illustrating the tethering system, constructed in accordance with the present invention, for inflatable airfoils.
Figure 8:
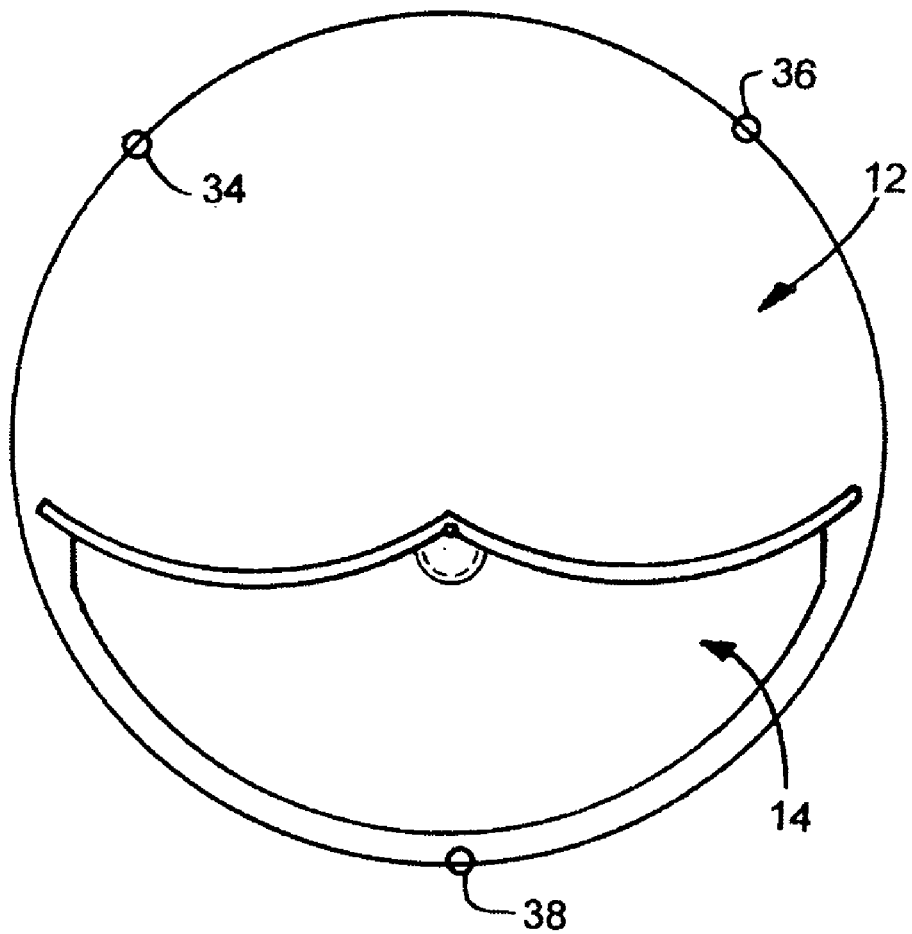
FIG. 8 is a bottom plan view illustrating positioning of the airfoil wing for use with the tethering system, constructed in accordance with the present invention, for inflatable airfoils.

As illustrated in FIGS. 1-8, the present invention is a tethering system, indicated generally at 10, for an inflatable airfoil 12 with an airfoil wing 14 allowing a user to better control and stabilize the inflatable airfoil 12 during flight. Used in conjunction with the adjustable wing line apparatus described in U.S. patent application Ser. No. 12/386,232, incorporated by reference, or without the adjustable wing line apparatus, the tethering system 10 provides stability of the inflatable airfoil 12 in all flight conditions, especially during high wind conditions. In addition, the tethering system 10 of the present invention allows air to escape from beneath the airfoil wing 14 thereby allowing the user to safely bring the inflatable airfoil 12 down to the ground even in high wind conditions. It should be noted that references to the ground and lines extending to the ground can be attached to devices that are located on or above the ground itself.

The airfoil wing 14 of the tethering system 10 of the present invention is preferably secured to the inflatable airfoil 12. In a preferred embodiment, the airfoil wing 14 includes a connecting edge 18, a first side edge 20 extending from the connecting edge 18, a second side edge 22 extending from the connecting edge 18 substantially opposite the first side edge 20, a first leading edge 24 extending from the first side edge 20, and a second leading edge 26 extending from the second side edge 22. The first side edge 20 preferably forms an obtuse angle with the connecting edge 18 and the second side edge 22 preferably also forms an obtuse angle with the connecting edge 18. The first leading edge 24 extends from the first side edge 20 and the second leading edge 26 extends from the second side edge 22 with the first leading edge 24 and the second leading edge 26 connecting at a point distant from the first side edge 20 and the second side edge 22.

The airfoil wing 14 of the tethering system 10 of the present invention is preferably secured to the inflatable airfoil 12 along the connecting edge 18, the first side edge 20, and the second side edge 22. The edges 18, 20, 22 can be secured using an adhesive material or other means, depending on the desires of the manufacturer or user. In addition, preferably, the connecting edge 18, the first side edge 20, and the second side edge 22 have reinforcement tape providing additional strength to the connecting edge 18, the first side edge 20, and the second side edge 22. Preferably, the tape extends beyond the edges 18, 20, 22.

The leading edges 24, 26 of the airfoil wing 14 of the tethering system 10 of the present invention preferably has an edge reinforcement strap 28 secured thereto using an adhesive material and/or sewing, or other means, depending on the desires of the manufacturer or user. In addition, preferably, the edge reinforcement strap 28 extends beyond the first side edge 20 and the second side edge 22 and is secured to the inflatable airfoil 12 in the same or different manner as the edges 18, 20, 22. It is desirable for strength and durability for the edge reinforcement strap 28 to be on continuous strap along the leading edges 24, 26 although having a noncontinuous edge reinforcement strap 28 is within the scope of the present invention.

The airfoil wing 14 of the tethering system 10 of the present invention further includes a surface reinforcement strap 30 secured to the airfoil wing 14 from the intersection of the first leading edge 24 and the second leading edge 26 across the airfoil wing 14 to the proximate center of the connecting edge 18. Preferably, the surface reinforcement strap 30 is secured to the airfoil wing 14 using an adhesive material and/or sewing or other means, depending on the desires of the manufacturer or user. The surface reinforcement strap 30 extends beyond the connecting edge 18 to a rear attachment ring 32, as will be described in further detail below. A tether line attachment point is formed at the intersection of the first leading edge 24 and the second leading edge 26.

The tethering system 10 of the present invention has a plurality of attachment rings and a plurality of airfoil reinforcement straps. In a preferred embodiment, the tethering system 10 has a first forward attachment ring 34, a second forward attachment ring 36, a rear attachment ring 38, and a center attachment ring 40. Preferably, the first forward attachment ring 34, the second forward attachment ring 36, and the rear attachment ring 38 are secured to the inflatable airfoil 12 along it equator or center line while the center attachment ring 40 is secured to the inflatable airfoil 12 at the center of the top surface. Further, the rear attachment ring 38 is preferably secured to the inflatable airfoil 12 at the rear of the inflatable airfoil 12 while the first forward attachment ring 34 and the second forward attachment ring 36 are preferably secured to the inflatable airfoil 12 approximately ninety (90°) degrees from each other (approximately forty-five (45°) from the center line of the inflatable airfoil 12) and approximately one hundred and thirty-five (135°) degrees and equal distant from the rear attachment ring 38. Each of the attachment rings 34, 36, 38, 40 can be secured to the inflatable airfoil 12 by an adhesive material and/or stitching or other means.

In a preferred embodiment, the tethering system 10 of the present invention has three airfoil reinforcement straps. A first airfoil reinforcement strap 42 extends between the first forward attachment ring 34 and the center attachment ring 40. A second airfoil reinforcement strap 44 extends between the second forward attachment ring 36 and the center attachment ring 40. A third airfoil reinforcement strap 46 extends between the rear attachment ring 38 and the center attachment ring 40. The combination of the attachment rings 34, 36, 38, 40 and the airfoil reinforcement straps 42, 44, 46 provides better stability and control of the inflatable airfoil 12 during flight and take downs.

The tethering system 10 of the present invention includes a first control line 48 extending from the first forward attachment ring 34 to the apex or adjustable wing line apparatus and a second control line 50 extending from the second forward attachment ring 36 to the apex or adjustable wing line apparatus. The surface reinforcement strap 30 of the airfoil wing 14 is secured to the rear attachment ring 38, as mentioned briefly above. A tether or keel line 52 extends from the tether line attachment point on the airfoil wing 14 to the apex or adjustable wing line apparatus. The first control line 48 and the second control line 50 are connected together with a knot of the lines or other fastening mechanism. From the apex to the ground, the keel line 52 remains a single control line for maintaining control over the inflatable airfoil 12 during flight. It should be noted that the single control line can be either the continuation of the keel line 52, a new line extending from the connection of the lines at the apex, or a continuation of one of the front control lines 48, 50, as desired by the manufacturer or user.

In sum, the tether system 10 of the present invention allows a user to better control an inflatable airfoil 12 during flight and when bringing the inflatable airfoil 12 to the ground during flight. Additionally, the tethering system 10 has a plurality of reinforcement straps 42, 44, 46 across the top of the inflatable airfoil 12 for better control of the inflatable airfoil 12 thereby maximizing the flight and stability of the inflatable airfoil 12. Furthermore, the tethering system 10 has a strap secured to the airfoil wing 14 for better control and adjustability of the airfoil wing 14 for maintaining the optimum flight angle.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A tethering system for controlling an inflatable airfoil, the inflatable airfoil having a horizontal center line defining a top surface and a bottom surface and a vertical center line defining a front surface and a rear surface, the tethering system comprising:
    an airfoil wing having a connecting edge, a first leading edge, and a second leading edge, the connecting edge secured to the inflatable airfoil;
    a first forward attachment ring secured to the inflatable airfoil;
    a second forward attachment ring secured to the inflatable airfoil;
    a rear attachment ring secured to the inflatable airfoil;
    a center attachment ring secured to the inflatable airfoil;
    a first airfoil reinforcement strap secured between the first forward attachment ring and the center attachment ring;
    a second airfoil reinforcement strap extends between the second forward attachment ring and the center attachment ring;
    a third airfoil reinforcement strap extends between the rear attachment ring and the center attachment ring;
    a surface reinforcement strap secured to the airfoil wing from the intersection of the first leading edge and the second leading edge across the airfoil wing to the proximate center of the connecting edge, the intersection of the first leading edge and the second leading edge forming a tether line attachment point, the surface reinforcement strap extending beyond the connecting edge to the rear attachment ring; and
    control means for controlling the inflatable airfoil during flight.

2. The tethering system of claim 1 wherein the airfoil wing has the connecting edge, a first side edge extending from the connecting edge, a second side edge extending from the connecting edge substantially opposite the first side edge, the first leading edge extending from the first side edge, and the second leading edge extending from the second side edge, the first side edge and the second side edge forming an obtuse angle with the connecting edge, the first leading edge extending from the first side edge and the second leading edge extending from the second side edge with the first leading edge and the second leading edge connecting at a point distant from the first side edge and the second side edge.

3. The tethering system of claim 2 wherein the airfoil wing is secured to the inflatable airfoil along the connecting edge, the first side edge, and the second side edge, the connecting edge, the first side edge, and the second side edge having reinforcement material secured thereto, the reinforcement material extending beyond the edges.

4. The tethering system of claim 2 wherein the leading edges of the airfoil wing have an edge reinforcement strap secured thereto, the edge reinforcement strap extending beyond the first side edge and the second side edge, the portions of the edge reinforcement strap extending beyond the side edges secured to the inflatable airfoil.

5. The tethering system of claim 4 wherein the edge reinforcement strap is a continuous strap.

6. The tethering system of claim 1 wherein the first forward attachment ring, the second forward attachment ring, and the rear attachment ring are secured to the inflatable airfoil along the horizontal center line and the center attachment ring is secured to the inflatable airfoil along the vertical center line.

7. The tethering system of claim 6 wherein the rear attachment ring is secured to the inflatable airfoil at the rear of the inflatable airfoil while the first forward attachment ring and the second forward attachment ring are secured to the inflatable airfoil approximately ninety (90°) degrees from each other, approximately forty-five (45°) from the center line of the inflatable airfoil, and approximately one hundred and thirty-five (135°) degrees and equal distant from the rear attachment ring.

8. The tethering system of claim 1 wherein the control means includes a first control line extending from the first forward attachment ring, a second control line extending from the second forward attachment ring, and a keel line extending from the airfoil wing.

9. A tethering system for controlling an inflatable airfoil, the inflatable airfoil having a horizontal center line and a vertical center line, the tethering system comprising:
    an airfoil wing secured to the inflatable airfoil, the airfoil wing having a connecting edge, a first side edge extending from the connecting edge, a second side edge extending from the connecting edge substantially opposite the first side edge, a first leading edge extending from the first side edge, and a second leading edge extending from the second side edge;
    a surface reinforcement strap secured to the airfoil wing from the intersection of the first leading edge and the second leading edge across the airfoil wing to the proximate center of the connecting edge, the intersection of the first leading edge and the second leading edge forming a tether line attachment point, the surface reinforcement strap extending beyond the connecting edge to connect directly to the airfoil;
    a first forward attachment ring secured to the inflatable airfoil;
    a second forward attachment ring secured to the inflatable airfoil;
    a rear attachment ring secured to the inflatable airfoil;
    a center attachment ring secured to the inflatable airfoil;
    a first airfoil reinforcement strap secured between the first forward attachment ring and the center attachment ring;
    a second airfoil reinforcement strap extends between the second forward attachment ring and the center attachment ring;
    a third airfoil reinforcement strap extends between the rear attachment ring and the center attachment ring; and
    control means for controlling the inflatable airfoil during flight;
    wherein the surface reinforcement strap is securable to the inflatable airfoil adjacent the connecting edge.

10. The tethering system of claim 9 wherein the first side edge and the second side edge form an obtuse angle with the connecting edge, the first leading edge extending from the first side edge and the second leading edge extending from the second side edge with the first leading edge and the second leading edge connecting at a point distant from the first side edge and the second side edge.

11. The tethering system of claim 9 wherein the airfoil wing is secured to the inflatable airfoil along the connecting edge, the first side edge, and the second side edge, the connecting edge, the first side edge, and the second side edge having reinforcement material secured thereto, the tape extending beyond the edges.

12. The tethering system of claim 9 wherein the leading edges of the airfoil wing have an edge reinforcement strap secured thereto, the edge reinforcement strap extending beyond the first side edge and the second side edge, the portions of the edge reinforcement strap extending beyond the side edges secured to the inflatable airfoil.

13. The tethering system of claim 12 wherein the edge reinforcement strap is a continuous strap.

14. The tethering system of claim 9 wherein the surface reinforcement strap extends beyond the connecting edge to the rear attachment ring.

15. The tethering system of claim 9 wherein the first forward attachment ring, the second forward attachment ring, and the rear attachment ring are secured to the inflatable airfoil along the horizontal center line and the center attachment ring is secured to the inflatable airfoil along the vertical center line.

16. The tethering system of claim 15 wherein the rear attachment ring is secured to the inflatable airfoil at the rear of the inflatable airfoil while the first forward attachment ring and the second forward attachment ring are secured to the inflatable airfoil approximately ninety (90°) degrees from each other, approximately forty-five (45°) from the center line of the inflatable airfoil, and approximately one hundred and thirty-five (135°) degrees and equal distant from the rear attachment ring.

17. The tethering system of claim 9 wherein the control means includes a first control line extending from the first forward attachment ring, a second control line extending from the second forward attachment ring, and a keel line extending from the airfoil wing.

* * * * *